(12) United States Patent
Atencio et al.

(10) Patent No.: US 7,950,464 B2
(45) Date of Patent: May 31, 2011

(54) MULTI-WELL CONTROLLER

(75) Inventors: Michael E. Atencio, Calgary (CA); Mark A. Walsh, Littleton, CO (US)

(73) Assignee: Production Control Services, Inc., Frederick, CO (US)

( * ) Notice: Subject to any disclaimer, the term of this patent is extended or adjusted under 35 U.S.C. 154(b) by 501 days.

(21) Appl. No.: 11/669,824

(22) Filed: Jan. 31, 2007

(65) Prior Publication Data

US 2007/0175640 A1 Aug. 2, 2007

Related U.S. Application Data

(60) Provisional application No. 60/763,590, filed on Jan. 31, 2006.

(51) Int. Cl.
*E21B 7/12* (2006.01)
*E21B 43/12* (2006.01)

(52) U.S. Cl. .......... 166/360; 166/250; 166/250.01; 166/52; 166/53; 166/66

(58) Field of Classification Search .......... 166/366, 166/250.15, 52, 53, 66, 250.01
See application file for complete search history.

(56) References Cited

U.S. PATENT DOCUMENTS

| | | |
|---|---|---|
| 3,036,585 A | 5/1962 | Shawhan |
| 3,219,046 A | 11/1965 | Waugh |
| 3,863,714 A | 2/1975 | Watson, Jr. |
| 3,909,603 A | 9/1975 | Nicolas |
| 4,138,669 A | 2/1979 | Edison et al. |
| 4,150,721 A | 4/1979 | Norwood |
| 4,211,279 A | 7/1980 | Isaacks |
| 4,352,376 A | 10/1982 | Norwood |
| 4,410,038 A | 10/1983 | Drapp |
| 4,526,228 A | 7/1985 | Wynn |
| 4,596,516 A | 6/1986 | Scott et al. |
| 4,633,954 A | 1/1987 | Dixon et al. |
| 4,664,602 A | 5/1987 | Gordon |
| 4,685,522 A | 8/1987 | Dixon et al. |
| 4,916,617 A | 4/1990 | Norwood |
| 4,921,048 A | 5/1990 | Crow et al. |
| 4,989,671 A | 2/1991 | Lamp |
| 5,132,904 A | 7/1992 | Lamp |
| 5,146,991 A | 9/1992 | Rogers, Jr. |
| 5,314,016 A | 5/1994 | Dunham |
| 5,526,883 A | 6/1996 | Breaux |
| 5,680,899 A | 10/1997 | Waid et al. |
| 5,785,123 A | 7/1998 | Lea, Jr. |
| 5,864,772 A | 1/1999 | Alvarado et al. |
| 5,878,817 A | 3/1999 | Stastka |
| 5,912,883 A | 6/1999 | Hershberg |

(Continued)

*Primary Examiner* — Daniel P Stephenson
*Assistant Examiner* — Yong-Suk Ro
(74) *Attorney, Agent, or Firm* — Aileen Law; A Law Firm, P.C.

(57) ABSTRACT

An improved multi-well control system (MWCS) has a centrally based multi-well controller (MWC) in communication with one or more slave controllers and one or more electronic flow measurement devices (EFMs) for instant data monitoring and control of individual wells. The system also provides for an application host sub-system (AHSS) in communication with the MWC for historical and instant data retention. The system is capable of assigning one or more wells to a group for allocation purposes and organizing groups dependent on production levels of individual wells. The MWC is capable of tracking gas volumes produced by each well independent of groupings and communicating such data to the AHSS. The MWC provides monitoring and tracking data from one or more EFM devices and assigns total flow volume to individual wells. The entire MWCS can result in the reduction of manpower and an increase in overall production efficiency.

34 Claims, 8 Drawing Sheets

U.S. PATENT DOCUMENTS

| | | | |
|---|---|---|---|
| 5,957,200 A | 9/1999 | Majek et al. | |
| 6,016,191 A | 1/2000 | Ramos et al. | |
| 6,023,340 A | 2/2000 | Wu et al. | |
| 6,032,919 A | 3/2000 | Giacomino et al. | |
| 6,048,175 A | 4/2000 | Corlew et al. | |
| 6,101,445 A | 8/2000 | Alvarado et al. | |
| 6,192,980 B1 * | 2/2001 | Tubel et al. | 166/65.1 |
| 6,196,324 B1 | 3/2001 | Giacomino et al. | |
| 6,241,014 B1 | 6/2001 | Majek et al. | |
| 6,368,068 B1 | 4/2002 | Corlew et al. | |
| 6,464,011 B2 | 10/2002 | Tubel | |
| 6,470,969 B1 | 10/2002 | Sørhaug et al. | |
| 6,519,568 B1 | 2/2003 | Harvey et al. | |
| 6,564,872 B2 | 5/2003 | Davey et al. | |
| 6,595,287 B2 | 7/2003 | Fischer | |
| 6,736,212 B2 | 5/2004 | Liew | |
| 6,754,589 B2 | 6/2004 | Bush | |
| 6,798,350 B2 | 9/2004 | Maxit et al. | |
| 6,814,104 B2 | 11/2004 | Dean | |
| 7,006,920 B2 | 2/2006 | Newman et al. | |
| 7,099,780 B2 | 8/2006 | Faur et al. | |
| 2004/0122872 A1 | 6/2004 | Pandya et al. | |
| 2005/0103491 A1 | 5/2005 | Newman et al. | |

* cited by examiner

MULTI-WELL CONTROLLER

CROSS REFERENCE APPLICATIONS

This application is a non-provisional application claiming the benefits of provisional application No. 60/763,590 filed Jan. 31, 2006.

TECHNICAL FIELD OF ART

The present apparatus relates to an improved well control system comprising hardware devices, software and firmware for automatically adjusting production parameters based on real time data to facilitate and optimize production in a system comprising multiple hydrocarbon wells. More specifically, the improved control system could comprise at least one master well multi-controller in communication with one or more slave well controllers, one or more electronic flow measurement devices and an application host, wherein the system regulates and tracks data derived from one or more gas wells in a pressurized well system.

BACKGROUND

Gas and oil well production efficiency can depend on various well parameters such as depth and natural well gas pressure. Fluid comprising salt water and oil may accumulate during production in a well bottom. Its presence and buildup within the well can inhibit production and, accordingly, should be removed. Operators may use a technique such as plunger lift to unload the fluid buildup and thus increase the productivity of oil and gas wells.

A plunger system is a method of unloading gas wells and high gas/liquid ratio hydrocarbon wells without interrupting production. In operation, the plunger travels to the bottom of the well where the fluid is picked up by the plunger, acting as a swab, and is brought to the surface removing liquids in the tubing. A plunger also keeps the tubing free of paraffin, salt or scale build-up. Fluid removal prevents well loading, and thus keeps the well from "dying." This type of system utilizes gas present within the well as a system driver.

A well system manager (hereinafter also referred to as an operator) may have many wells under its supervision. Although in some cases, an individual may be present at a well site, the present apparatus contemplates a reduction of manpower needed to monitor and service the system. Any one or more of these multiple wells may utilize a plunger lift system. A multiple well facility is generally known as a location where more than one well and/or associated production equipment are located, where some or all production equipment is shared by more than one well, or where wellstreams from more than one well are routed through individual production trains located at the same or contiguous and adjacent location. Rather than install separate facilities for each well, well system managers seek to combine or "share" stock tank storage, meter runs, separation facilities and/or compressor stations. In addition to the complexity of managing multiple individual wells each potentially owned by a different investor, the sharing of production equipment could create a number of challenges for a well system manager. Some challenges could include ensuring accurate allocation measurements and minimizing occurrences that could lead to "bottlenecking". In addition, operators are challenged to ensure that each well (and its associated investor) has a fair opportunity to produce for a period of time.

Inaccuracies in allocating gas to an appropriate investor and/or the non-production of a well could have detrimental and costly effects. Bottlenecking can result in under-utilization of shared facilities and/or exceedances. A flow cycle comprises the time a well is turned on to the time it is turned off. Former practices often involved synchronizing multiple wells by having an operator gauge each well's production by physically and tediously recording each cycle time. In addition, mechanized synchronization centered on time-based algorithms that operated on individual controllers with no common link, requiring the well operator to continue to ensure no overlapping of wells. In some cases, because of asymmetrical production rates, the production rate of one well may impede that of its neighboring wells. Without a balanced synchronization, routine inconsistencies encountered by a well system manager during production, such as pressure buildups, pipeline pressures, non-arrival of plungers, etc., can create unnecessary downtime and loss of production. In addition, asymmetrical production from a group of wells can cause the weaker wells to stay off. To enhance and/or optimize efficiency of a multiple well facility, a well system manager may desire a method of controlling and analyzing multiple well data and multiple plungers. The present apparatus can provide multi-well control and product management by means of a master controller and allows for a more balanced synchronization of wells and well cycle times.

SUMMARY OF THE DISCLOSURE

The present apparatus can provide an automated, distributed control system for controlling and operating multiple hydrocarbon production wells. The disclosed multi-well controller system (MWCS) can allow an operator to remotely access, monitor, and control one or more slave controllers from a centrally located master controller. Specifically, an operator can access control features, plunger histories, and production data by means of a keypad display terminal located on a multi-well controller (MWC), a local operator interface port or through any remote work station having connectivity to the MWC, e.g., an application host sub-system (AHSS), or even a serially connected laptop, etc. A workstation can be either connected directly to a host server or remote node connected to a Wide Area Network (WAN). For example, an operator can read plunger history data from an MWC from a computer mounted in a field vehicle. The truck-mounted MWC is presented by example, and not of limitation; various embodiments are possible.

A MWC may be integrated with an AHSS, one or more electronic flow measurement (EFM) devices, and individual slave wellhead controllers (SWC). With appropriate software, the AHSS can allow a user to view various data derived from a well or a group of wells and direct real-time well control, monitoring and data analysis. For example, the AHSS may track and record flow data and/or a plunger's history at a well and signal the well to open/close (turn on/off) based on data received. In addition, the AHSS may signal for a flow rate change. Although these features are discussed, various other configurations and capabilities are possible. The MWCS can comprise field upgradeable firmware via a code module program chip, about 1 MB or more of data storage that is typically viable for about 30 to about 45 days, and communication via Modicon Modbus protocol. Wired or wireless controls and remote I/O modules can be employed. Data monitoring and exchange can also occur by means of radio and/or modem communication if desired.

This system can also provide a flexible means for grouping wells and/or synchronizing wells based on production characteristics. Typically each group comprises one or more wells physically tied together at a juncture prior to a gas-fluid separator. With the disclosed system, an operator can categorize well groups by well production levels. In addition to allowing an operator to group low producing wells having shorter cycle intervals together to maximize a sequential production of the grouped wells, the MWC can also regulate higher producers by assigning them to any particular group. For example, an operator can determine whether a strong well is required to wait for other weaker wells to finish a cycle before the strong well goes on-line. Wells may be categorized by various other criteria. For example, producers that may not be on a plunger lift could be assigned as the only well within a group. In addition to helping a user form various well combinations, the present apparatus can be used to group meter runs and/or EFMs so gas production can be synchronized within respective groups. Such unit groupings can be a dynamic tool for allocating production and for customizing well operation and optimization. Although these features are discussed, the disclosed configurations are presented by example, and not of limitation; various groupings and synchronizations are possible.

As stated above, a flow cycle comprises the time a well is turned on to the time it is turned off. Individualized optimization settings or "set points" can be set up for each well depending on a well's natural characteristics and/or other criteria and by using any of the supported production methods based on time, pressure, and flow. A set point is an internal control that can be used to determine when an overload could occur, and when a system should be held back. Thus, the disclosed system can allow for wells to be synchronized in such a way that individual wells or groups of wells can be turned on or off by simply monitoring the well's characteristics. The MWCS can hold a successor well back and allow a well with the longest "closed" or "shut in" period to cycle. The MWCS thus evens out the well cycle times to minimize gaps in production. Because of automation and effective management of data, the present apparatus can also help to reduce manpower needed to monitor and service the system and allow personnel to be allocated to other areas.

Typically, well production records can only be generated for one well at a time and by means of an EFM specifically assigned to that well. In short, each well is equipped with its own EFM device. With the present apparatus, an operator may designate any EFM device for a well. Thus, individual production records for a well can be maintained by a designated EFM device. In addition, multiple wells can be routed through any designated EFM.

Not only can the MWCS gather information such as flow rate and flow line pressure ($P_L$) from one or more EFM devices, gas flow volumes, temperature and differential and static pressure can also be measured and/or recorded. Other data including, but not limited to, tubing pressure ($P_T$), casing pressure ($P_C$), valve opening/closing, plunger arrival time, etc. can be acquired as well. Any data derived by the present apparatus may be sorted, grouped, and otherwise used or managed by an operator as desired. In addition, the application software provides for easily understood graphics and report flexibility and accessibility.

The MWC can track well production during each flow cycle and/or until the succeeding well is turned on. By communicating with one or more EFMs, the MWCS also has the capability to track and store raw data accompanied with time stamped events, reason codes with analysis, and gas volumes produced by each well regardless of groupings. All well controller changes and well status records can be kept in permanent files for future reference and record keeping. An operator can allocate gas by well even if multiple wells are routed through one EFM and/or meter run. The MWCS can continue to operate if communication between one or more EFMs is damaged/broken.

With the present apparatus, a MWC can determine the integrity of a communication link between a master and slave. The MWC can signal any one or more SWCs to respond to verify the integrity of a communication link. If a communication link is damaged/broken, an SWC may not respond. The MWC could then perform a number of verification tests to determine a communication status. If the MWC is unable to confirm a communication link, any one or more SWCs can proceed under a default program. For example, a SWC may be able to operate based on its last set of input commands. In some cases, the system continues to produce with the well's available set points.

As stated above, operators can experience inaccuracies in allocating gas to an appropriate investor. These inaccuracies can be caused by asymmetrical production from a group of wells. For example, a strong well can usually yield a high rate of product and may fight other wells that attempt to turn on. In some cases, a strong well could impede production from a weaker well. Where multiple wells operate simultaneously but with extremely high and low production ranges, a meter may not be able to read the total of volume that is actually produced because it has been "pegged." The methodology discussed herein evens out the cycle times (so weaker wells can turn on) and reduces the likelihood for meter pegging. By reading virtually all of the metered flow volume, the present apparatus can facilitate a more accurate allocation of gas by identity of well. In addition, meter damage can be reduced.

The sharing of meter runs, tankage, separation and compressor facilities can create bottlenecking challenges. Bottlenecking typically occurs when gas wells load up with liquid and production proceeds on an intermittent basis, either with or without plunger lift, instead of on an optimum continuous flow basis. On an intermittent basis, extremely high and low production ranges can be experienced. In addition, there may be periods of equipment under-utilization if a well must be completely shut in to allow a pressure buildup. For example, if a well group has an 18-hour total production period in a 24-hour period, with several wells producing at the same time, and no production during the remaining 6 hours, a compressor can potentially be idle for a 6-hour period. During such an underload situation, a compressor may also fail because of low suction and high temperature occurrences. Thus, bottlenecking can result in lost use of infrastructure and lost labor time; production efficiency drops. On the other hand, during the 18-hour production rate, any exceedances could damage the compressor, especially in a high suction situation, also resulting in system down time.

Potential problems can also be encountered by a separator. Using the same 18-hour production and 6-hour downtime example, the high instantaneous production rate during the 18-hour period could cause the separator to foul. In addition, oil and water may emulsify undesirably in stock tanks, causing the emulsions to require treatment prior to hauling. Further, unwanted oil/water may be forced into a dry gas sales line, which could result in penalties to the well system manager. Without an efficient method of synchronizing the cycle times, facility sharing can present challenges. Through balanced well synchronization, the present apparatus can optimize intermittent production of multiple wells and reduce overloads and potential under-utilizations, resulting in efficient usage of shared flow lines, shared production facilities, and measurement equipment.

Thus, the MWCS comprises a MWC capable of interfacing and communicating with one or more wireless slave controllers each receiving and recording EFM data from individual wells, wherein each of the slave controllers may send specified well data to the MWC. An operator can utilize the system to combine one or more wells into one or more groups depending on any variety of data derived from individual wells, and thus synchronize the one or more wells to optimize production through various algorithms. In addition, an operator can utilize the system to track a variety of data derived from individual wells. For example, an operator may desire to track and record gas volumes produced by each well independent of its well grouping. As another example, an operator may desire to track a total flow volume from a well grouping in order to allocate a particular flow volume to an individual well. Based on system data, an operator may be able to control and optimize a cycle time for each well, turning the well on/off based on data received. Not only can the system be integrated with existing infrastructure if necessary, the MWCS can comprise field ready and user-friendly keyboard functionality.

These and other features and advantages of the disclosed apparatus reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
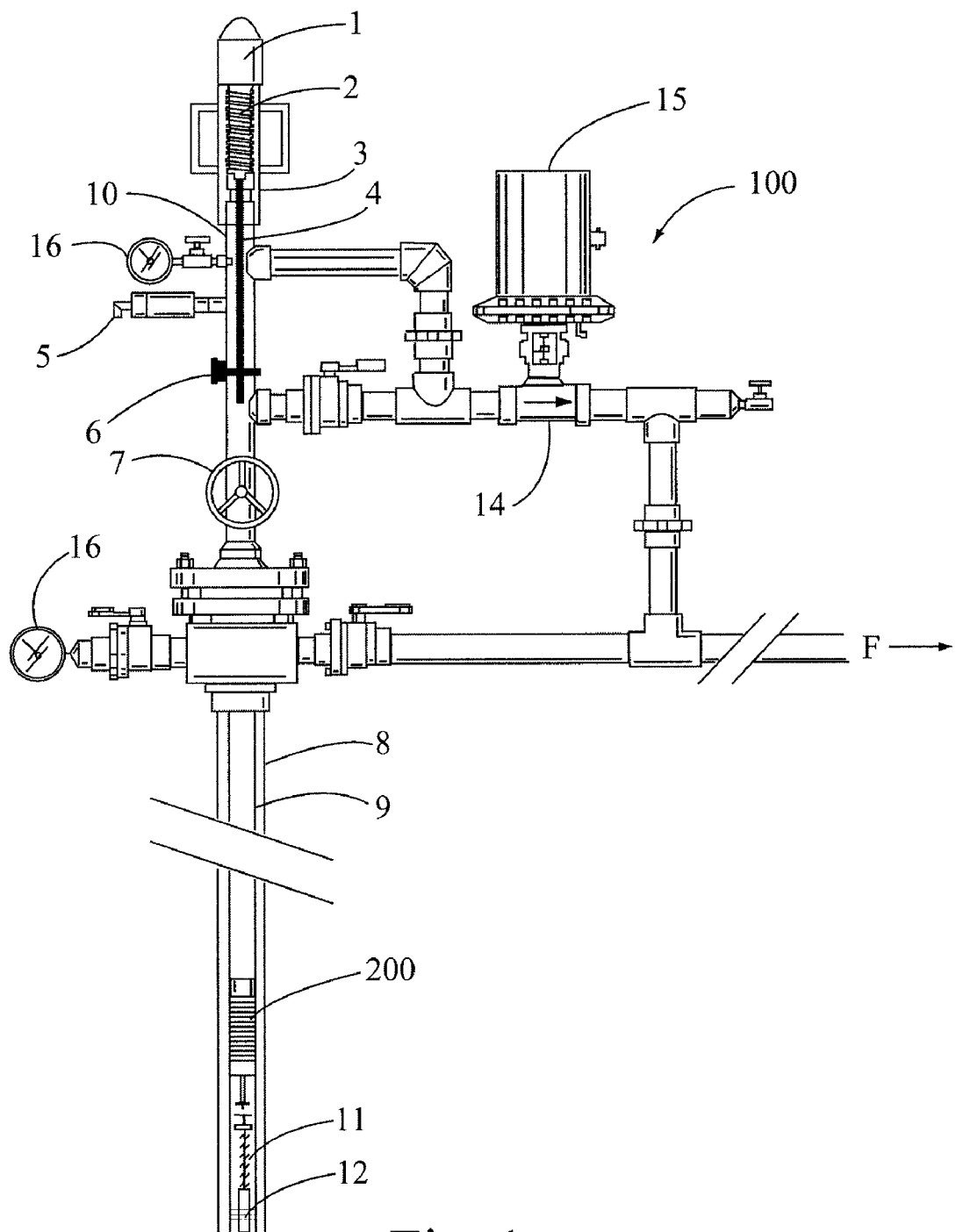
FIG. 1 (prior art) is an overview depiction of a typical plunger lift system installation.

The disclosed apparatus can regulate and track various functions and data derived from multiple gas wells in at least one pressurized well system. One or more high pressure hydrocarbon wells can comprise a plunger lift system for unloading gas. FIG. 1 shows a typical installation plunger lift system 100. A plunger 200 can represent a system plunger or other plungers which may include the prior art. Fluid (not shown), which is accumulated on top of plunger 200, can be carried to the well top by plunger 200.

A lubricator assembly 10 comprises a cap 1, an integral top bumper spring 2, a striking pad 3, and an extracting rod 4. Extracting rod 4 may or may not be employed depending on the plunger type. For example, an extracting rod may not be required for various embodiments of the present apparatus. Lubricator assembly 10 houses a plunger auto catching device 5 and a plunger sensing device 6. A surface controller 15, which opens and closes the well at the surface, typically receives a signal from plunger sensing device 6 upon plunger 200 arrival at the well top. A plunger's arrival at the well top can be used as an indicator of how to optimize a desired well production, flow times, wellhead operating pressures, etc. A master valve 7 should be sized correctly for the tubing 9 and plunger 200. An incorrectly sized master valve 7 could prevent plunger 200 from passing. For example, master valve 7 could incorporate a full bore opening equal to tubing 9 size. An oversized valve could also cause gas to bypass the plunger, causing the plunger to stall in the valve. If the plunger is to be used in a well with relatively high formation pressures, care should be taken to balance tubing 9 size with the casing 8 size.

The bottom of a well is typically equipped with a seating nipple/tubing stop 12. In FIG. 1, a spring standing valve/bottom hole bumper assembly 11 is located near the tubing bottom. The bumper spring is located above the standing valve and can be manufactured as an integral part of the standing valve or as a separate component of a plunger system.

Surface control equipment usually comprises motor valve(s) 14, sensors 6, pressure recorders 16, etc., and electronic surface controller 15. Fluid flow proceeds downstream in direction 'F' when surface controller 15 opens well head flow valves. Depending on the application, controllers can operate on time or pressure to open or close the surface valves based on operator-determined requirements for production. Thus, if desired, the present apparatus can employ modern electronic controllers that incorporate user friendly and easy to program interfaces, although mechanical controllers and other electronic controllers could be chosen as well. The present apparatus can also be integrated with controllers that feature battery life extension through solar panel recharging, computer memory program retention in the event of battery failure and built-in lightning protection. For complex operating conditions, controllers having multiple valve capability to fully automate the production process can be utilized.

Well controllers can use real time data derived from casing, tubing and sales line pressure transducers, which are readily found in the art, to optimize well production. One example of such a controller is the PCS 3000 Controller™, which can automatically adjust to deliver optimum flow and production rates based on real time data. Feedback from casing, tubing and sales line pressure transducers allows the well to flow until the well begins to load. The controller device can use sales line, tubing and casing pressure differential to begin each cycle and casing pressure to shut-in. The controller device can also offer time input if required. Unlike auto-adjusting time controllers, an operator can use real time pressure information to directly manage gas production and fluid entry for each cycle. The PCS 3000 Controller™ is presented by example, and not of limitation; other suitable well controllers can be employed.

Figure 6:
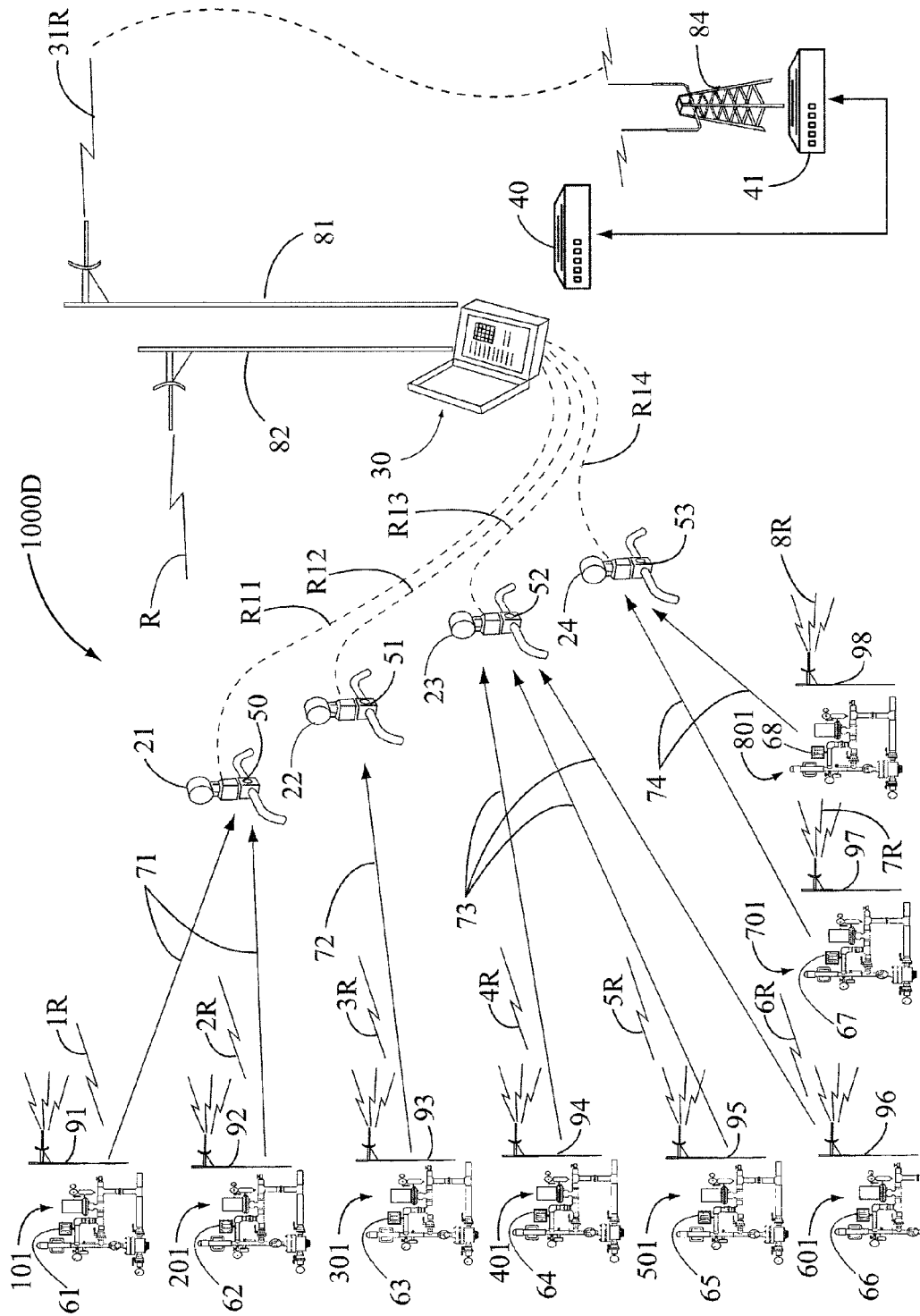
FIG. 6 is an overview depiction of an MWSC installation embodying the configuration shown in FIG. 4.
Figure 7:
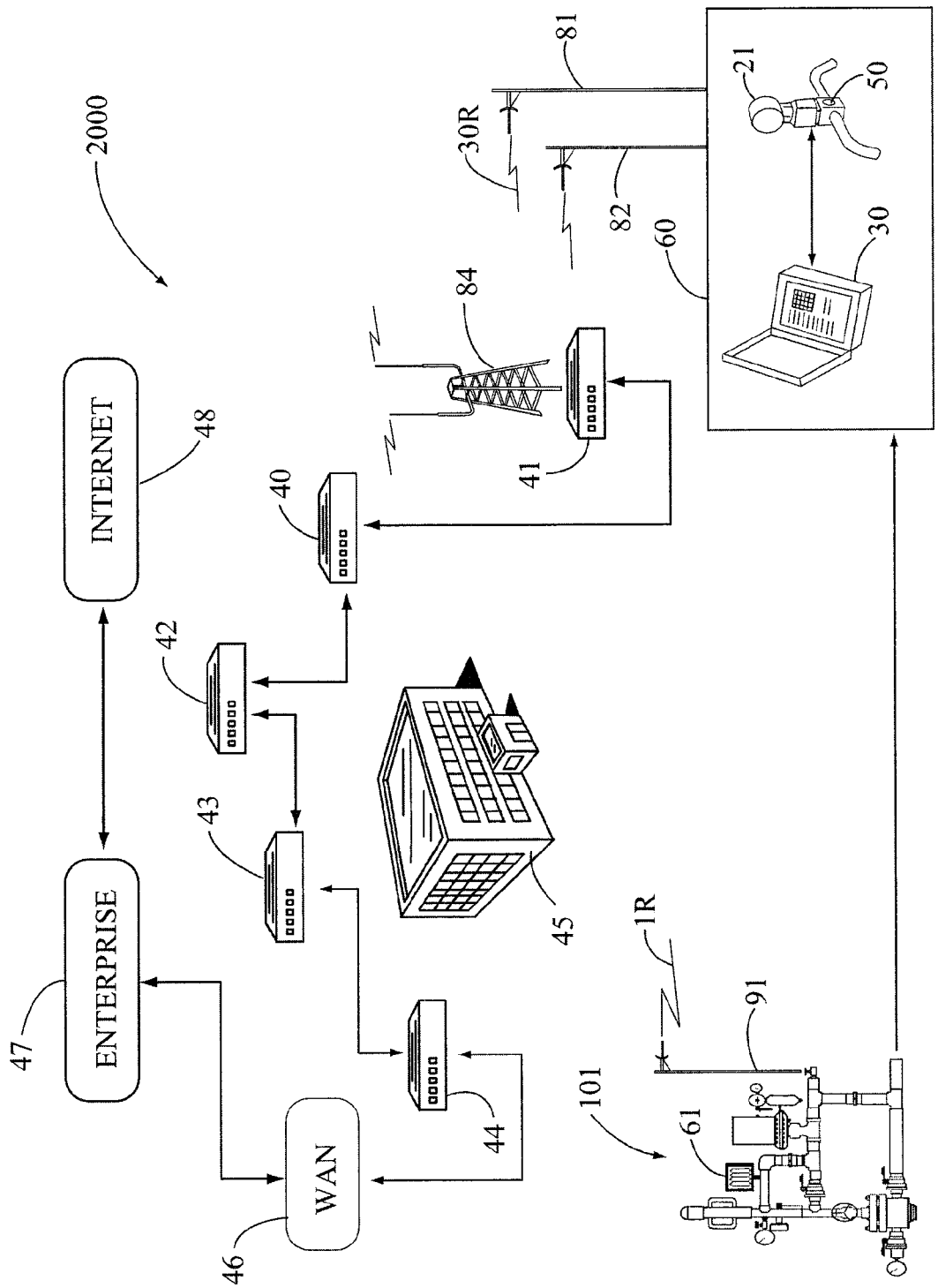
FIG. 7 is an overview depiction of an MWCS installation.

The present apparatus can be used to manage multiple wells and facilitate the sharing of meter runs, tankage and facilities. FIGS. 6, 7 each provide an overview of the present apparatus in conjunction with a typical installation plunger lift system. As shown in system 2000 of FIG. 7, a wellhead 101 comprises a slave wellhead controller (SWC) 61 and an antenna 91 sending a signal 1R to a MWC 30 which can be received at an antenna 82. A meter run 50 can be monitored by an EFM 21, which transmits data to MWC 30, either in digital or analog format. EFM 21, meter run 50 and MWC 30 are shown mounted within one physical structure 60, however, other configurations are possible. As shown, MWC 30 utilizes a keypad display terminal comprising a full function onboard keypad and LCD to allow an operator to perform functions such as control setup, transducer calibration, historic record and process variable status. MWC 30 communicates a signal 30R via an antenna 81 to a base antenna 84 and, in turn, to a base radio 41. In this example, signals 1R, 30R may each be a wireless signal, however, any suitable configuration may be employed. Base radio 41 links with an AHSS 40 in communication with an application server 42. A host service interface 43 sends data over a Local Area Network (LAN) 44 and a Wide Area Network (WAN) 46 to an enterprise 47 for worldwide accessibility via an internet 48. Base radio 41, AHSS 40, application server 42, host service interface 43, and LAN 44 can be housed within a facility complex 45.

One embodiment of MWC 30 comprises a motherboard microprocessor and a daughter board for added connectivity. An EFM translator board, a remote I/O wired or wireless general purpose board, a general purpose Remote Terminal Unit (RTU) board, a communication hub sharing board, and a keypad display terminal can be employed. A Supervisory Control and Data Acquisition (SCADA) software package can be positioned on top of hardware to which it is interfaced, in general via Programmable Logic Controllers (PLCs), or other commercial hardware modules. The motherboard can incorporate field upgradeable firmware. In addition, the disclosed motherboard contemplates communication via Modicon Modbus protocol; however, any interface could be used if desired. The present apparatus also contemplates a communication interface for RS232 and RS485 communication, and components capable of allowing TR485 communication with an EFM using the EFM's proprietary protocol or Modbus. An EFM translator board can also allow controllers to retrieve a user-specified list of values from the EFM and can act as a communications firewall to ensure safety and integrity of EFM data and settings.

Any remote I/O wired or wireless general purpose board and general purpose RTU board can be determined to be suitable by those of skill in the art. However, the disclosed apparatus contemplates a configuration with low power consumption that can operate on 6V or 12V battery. In addition, the general purpose boards should comprise a communication port to support RS485 or an optional radio communications module, Modbus or custom protocol, and field upgradeable firmware with custom RTU firmware available. In addition to facilitating the management of multiple wells with one master controller, the disclosed remote I/O board can be used for remote general purpose I/O, such as monitoring a tank battery. This board can greatly enhance gas and oil well point of delivery (POD) configurations in terms of facility throughput and compression efficiency.

As stated above, all disclosed communication links may be wireless or hard wired (typically RS485). The disclosed RTU board features an optional wireless radio communication module, built in I/O, expandable I/O, and the ability to perform remote I/O from another RTU board or another remote I/O board. In addition to running custom programs for well control, the disclosed RTU board can also perform general purpose I/O.

A MWC is capable of interfacing and communicating with one or more slave well controllers each receiving and recording data from individual wells. In addition to transmitting data to the MWC, a slave well controller (SWC) can also receive data from the MWC. In one embodiment, a SWC comprises a microprocessor connected to one or more analog wellhead pressure sensors, at least one plunger sensor, and one or more digital latch valves for motor valve control. As discussed herein, SWCs can also comprise software that can allow operation of the well semi-independently or autonomously in case of equipment failure at the MWC. Alternately, a well can also continue to operate if the integrity of the communication from the MWC is comprised. A SWC may also communicate with the MWC to signal for and to expedite field repairs.

The MWC can be connected to slaves by any standard industry means. For example, depending on design criteria, a system designer may incorporate hard wire connections or the master-slave connection can be realized remotely by means of radio frequency. Regarding master-slave communication, any standard industry interface, such as Modbus RTU mode, can be used. Modbus devices can communicate using a master-to-slave chain of command, whereby a master may address an individual slave and/or broadcast a command to more than one slave. Thus, SWCs receive information from the MWC. In one embodiment, the MWC and the SWCs each have 2048 registers in their maps. The register format us 16 bit Modicon. The communications format is RS232 at 9600, N, 8, 1.

Each SWC may recognize if, and when, a communication link with its MWC is compromised as a result of weather, maintenance, etc. In the disclosed system, each SWC can operate a well semi-independently or autonomously based on its electronic files in order to maintain well production. For example, a SWC can determine its last cycle time and/or the allocated time slot for the well. If a well cycle time is, e.g., 30 minutes and the allocated time slot for that well is, e.g., every 4 hours, the SWC can proceed accordingly. The MWC can, in turn, record reiterative SWC behavior which may signal an operator that a communication or equipment failure has occurred.

An operator maintains a synchronized clock on each SWC and the MWC. For each well, the MWC uses previous well performance in a group to generate a schedule documenting the actual time of day that each well is to open and shut in. Each time a well closes, the MWC checks that it still has communications with each well. Based on the reciprocal communication, the MWC may revise the schedule for the group and send the new schedule out to each well.

If a communication loss between the master and any or all of the wells in a group occurs, any or all of the wells may begin running on a new schedule assuming that well conditions allow each to open. If a well opens late due to the conditions of the well, that well may have an abbreviated cycle time since it may be scheduled to close at a certain time. If a well is ready to open and opens on schedule, the well may shut in based on either the clock or the condition of the well. There may even be periods during which no wells are flowing. However, if a MWC has maintained communications with a remainder of SWCs in a particular grouping, the MWC can continue to select the next well that is ready to open as usual.

The MWC could keep another well from opening during the period that the non-communicating well is scheduled to be open. During that period, the MWC can monitor the accumulated flow from the EFM associated with the non-communicating well. If the MWC detects no flow during two consecutive periods, it can be designed to assume the non-communicating well is down. The MWC can then remove the downed well from the schedule so that the remaining wells in the group are no longer prevented from operating.

As stated above, an EFM can measure and/or record data such as flow rate, $P_L$, $P_T$, $P_C$, and temperature. Various data extracted from the EFMs can be used to determine the duration that a well is shut in and the duration that the well is producing (the sales time). For example, a well may be instructed to seek a variety of data during its shut in time. When a condition or conditions are met, the well will turn on. One embodiment could comprise a system which seeks data such as shut in time, differential pressure, ratio of $P_T$ to $P_L$, the ratio of $P_C$ to $P_L$, the ratio of $P_T$ to $P_C$ and/or load factor (LF). LF is known as $((P_C-P_T)/(P_C-P_L))$. In other cases, a well may be instructed to seek a variety of data during its sales time. When a condition or conditions are met, the well will shut in. One embodiment could comprise a system which seeks data such as shut in time, critical flow rate, case pressure rise, high line pressure, and low line pressures. Thus, a well operator could use a variety of well parameters to determine a well's set points. EFMs can also measure and/or record gas flow volumes. From EFM data, an operator can perform calculations to optimize a flow time or a sales time for each well based upon variables such as flow rate and static pressure.

Any third party EFM device capable of data extraction may be integrated with the present apparatus. Although each EFM can typically be hard wired, any means of communicating data therefrom can be employed. For example, a serial wireless communication from an EFM to a MWC may be a feasible choice. If an operator intends for an EFM to monitor meter run, each EFM can be designed to monitor one or more meter runs in close proximity to the EFM or within the same physical structure.

If communication is lost between an EFM and its MWC, the system can continue based on the set points that it can still establish. Even if pressure data is unavailable, a system can revert to time and the ratio of $P_T$ to $P_C$. Modbus registers are typically polled for information for use in an audit trail. If an EFM is lost, its contract measurement data can be left intact.

In the present apparatus, the MWC can send data and receive input from an AHSS. Thus, an operator can utilize the MWC to take various desired actions. For example, an operator can issue an alarm code to the AHSS if necessary. In some cases, an operator may request that an AHSS override previously set commands. For example, by means of the host, an operator can override a well's set points and manually control a well's cycle time. This can be useful in cases where an operator needs to perform localized maintenance, for example. By overriding the system via the host, an operator can easily lock out the system so maintenance can take place. In addition to communicating with one or more MWCs, an AHSS could be used to store historical data by well, if desired. Not only can an AHSS communicate to an application server as shown in FIG. 7; it can also exchange data by means a LAN and/or a WAN to an enterprise for accessibility. The system contemplates an AHSS that can provide instant override control and monitoring capabilities via hard wire or wireless radio communications.

FIG. 6 illustrates another possible configuration of the present apparatus used in conjunction with a typical installation plunger lift system. As shown, system 1000D comprises eight well plunger lift systems 101, 201, 301, 401, 501, 601, 701, 801. A slave well controller 61, 62, 63, 64, 65, 66, 67, 68 controls a respective well. Antenna 91, 92, 93, 94, 95, 96, 97, 98 can send respective signal 1R, 2R, 3R, 4R, 5R, 6R, 7R, 8R to MWC 30. As stated above, wells can be grouped by an operator according to a variety of parameters. For example, the eight wells could be categorized according to well productivity. It is not unlikely for a strong well to be assigned to its own group. Groups comprising low producing wells tend to involve many wells. Intermediate wells make up the remainder of well types. In this example, slave wellhead controllers 61, 62 comprise a group 71, which could signify that the associated wells 101, 201 are intermediate producers. SWC 63 comprises a group 72, which could signify that the associated well 301 is a strong producer. SWC 64, 65, 66 comprise a group 73; SWC 67, 68 comprise a group 74. In FIG. 6, each meter run is physically located on the structure which houses a respective EFM, however, other configurations are possible. For example, instead of being housed on the same structure, the present apparatus could comprise a meter run and an EFM embodiment separate but in close proximity to one another. As discussed below in FIG. 4, the present apparatus also contemplates configurations comprising one or more meter runs.

As shown, EFM 21 monitors meter run 50 and tracks and/or records group 71 data. MWC 30 is shown to be in a wireless communication R11 with SWC 61, 62, wherein R represents a communication sent from MWC 30 to one or more SWCs. An EFM 22 monitors a meter run 51 and tracks and/or records group 72 data; an EFM 23 monitors a meter run 52 and tracks and/or records group 73 data; an EFM 24 monitors a meter run 53 and tracks and/or records group 74 data. In this example, data from each SWC is transmitted to MWC 30 by means of wireless links R11, R12, R13, R14 and to AHSS 40 by means of a wireless link 31R.

FIGS. 2 to 5 illustrate other configurations of the present apparatus in function block form. The examples presented generally embody systems comprising eight well systems. However, as discussed further below, the present apparatus can be expanded to accommodate various design criteria and can be configured for any number, variety, and characteristic of wells.

Figure 2:
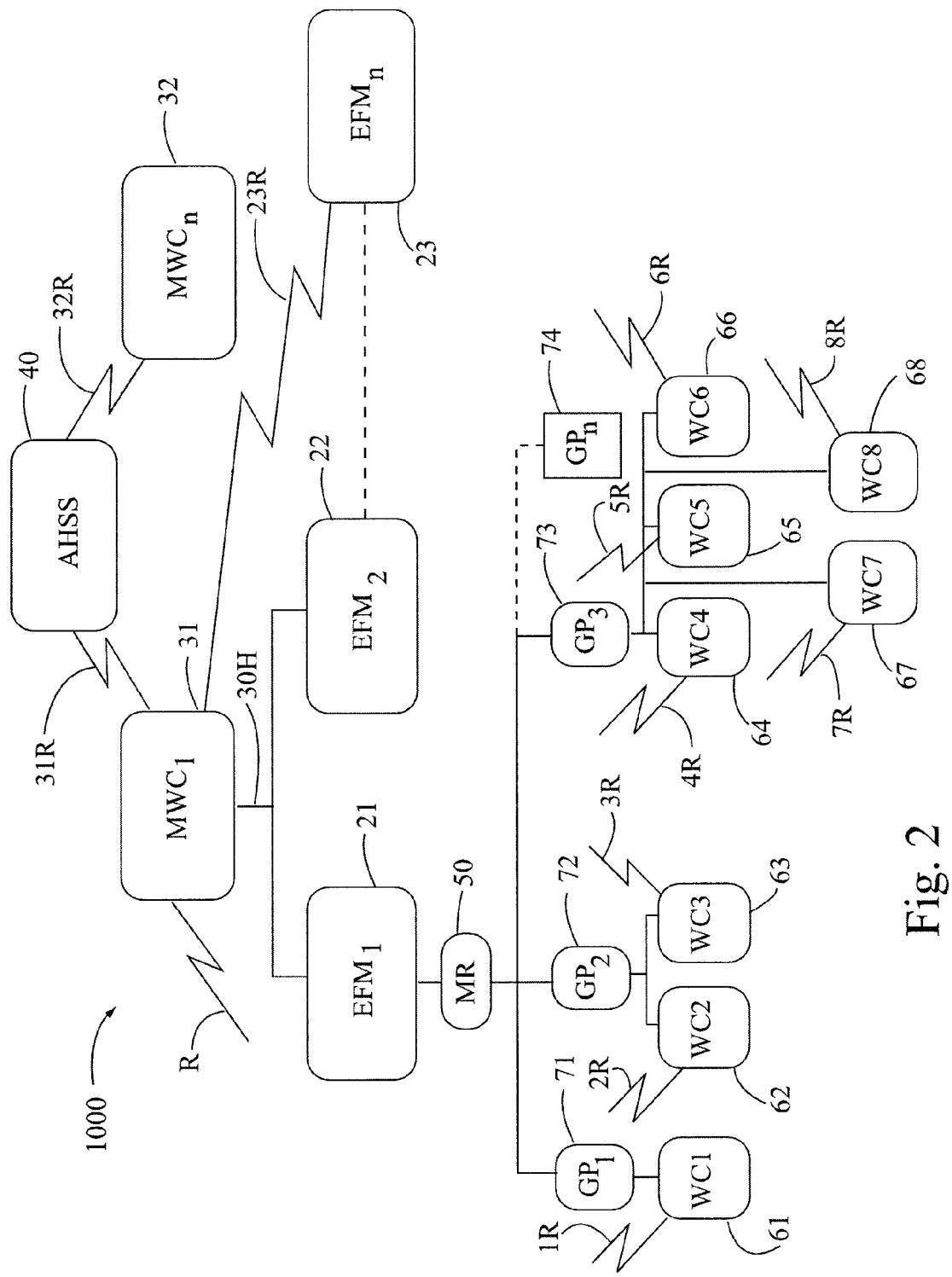
FIG. 2 is a basic function block diagram of one possible configuration of a multi-well control system (MWCS), said system comprising one MWC, one meter run, and eight slave controllers configured into three groups.

In FIG. 2, system embodiment 1000 comprises eight well plunger lift systems. In this example, slave wellhead controller (SWC) 61 comprises group $GP_1$ (or 71). SWC 62, 63 comprise group $GP_2$ (or 72). SWC 64, 65, 66, 67, 68 comprise group $GP_3$ (or 73), which could signify a grouping of low producing wells. Group $GP_n$ (or 74) represents the expansibility of the present apparatus. As shown, $EFM_1$ 21 monitors meter run 50 and tracks and/or records data from groups 71, 72, 73, 74. Thus, $EFM_1$ 21 monitors eight (or possibly more) wells. Each SWC 61, 62, 63, 64, 65, 66, 67, 68 is in wireless connection 1R, 2R, 3R, 4R, 5R, 6R, 7R, and 8R, respectively, with $MWC_1$ 31. In the configuration shown, $EFM_1$ 21 features a hard wire connection to meter run 50, $MWC_1$ 31, and $EFM_2$ 22. $EFM_2$ 22 and, in turn, $EFM_1$ 21, are in wireless connection with $EFM_1$ 23, which represents the expansibility of the present apparatus. As shown, $MWC_1$ 31 features a wireless connection 23R with $EFM_n$ 23.

$EFM_1$ 21 and the eight or more SWCs can exchange information with the respective $MWC_1$ 31. An operator can utilize this data to synchronize the individual well cycles. Through $MWC_1$ 31, an operator can command each slave controller to designate its respective well with a dynamic time slot based on a variety of well data. For example, well production history and current well data information could be used to calculate a unique sequence in which a well's slave controller will signal its respective well to turn on. This type of dynamic response capability can be useful especially in the case where a slave controller loses communication with an MWC. As stated above, an operator could calculate the unique well sequence with the present apparatus. For example, an operator could assign a priority to a well having the longest shut in period. In this case, the MWC signals each slave to allow that well to open and operate for a particular cycle time.

As stated above, $MWC_1$ 31 is shown in a hard-wired 30H communication with $EFM_1$ 21, $EFM_2$ 22. AHSS 40 is shown in wireless communication 31R with $MWC_1$ 31. If desired, AHSS 40 can communicate with one or more MWCs (see 32R), represented by $MWC_1$ 32. If, and when, an MWC fails, AHSS 40 can be designed to recognize a communication loss. Since it also records EFM data, it can make adjustments so that it can perform any necessary tasks, such as allocating gas.

Figure 3:
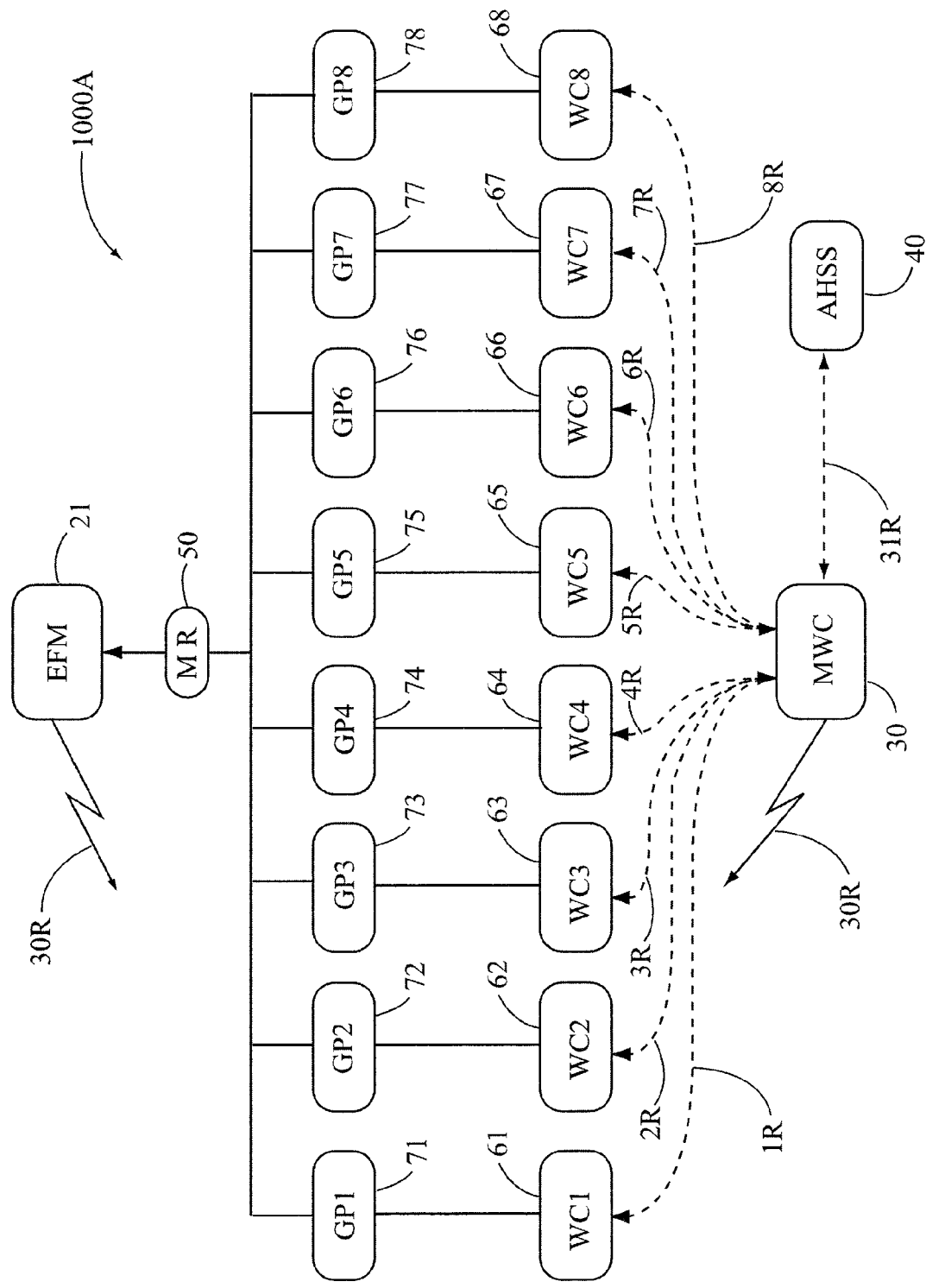
FIG. 3 is a function block diagram of a system comprising one MWC, one EFM monitoring and individual meter run, and eight slave controllers configured into eight groups.

In FIG. 3, system embodiment 1000A comprises eight well plunger lift systems. In this example, each slave wellhead controller (SWC) 61, 62, 63, 64, 65, 66, 67, 68 comprises its own respective group 71, 72, 73, 74, 75, 76, 77, 78. This configuration could signify that all eight wells are strong producers. A strong well typically does not require a large recovery time after its cycle time. As shown, EFM 21 monitors meter run 50 and tracks and/or records data from groups 71, 72, 73, 74, 75, 76, 77, 78. Data is transmitted to MWC 30 by means of wireless link 30R. Each slave well controller 61, 62, 63, 64, 65, 66, 67, 68 is in wireless connection 1R, 2R, 3R, 4R, 5R, 6R, 7R, and 8R, respectively, with MWC 30. Thus, MWC 30 may maintain control over each well. MWC 30 communicates with AHSS 40 via wireless link 31R.

Figure 4:
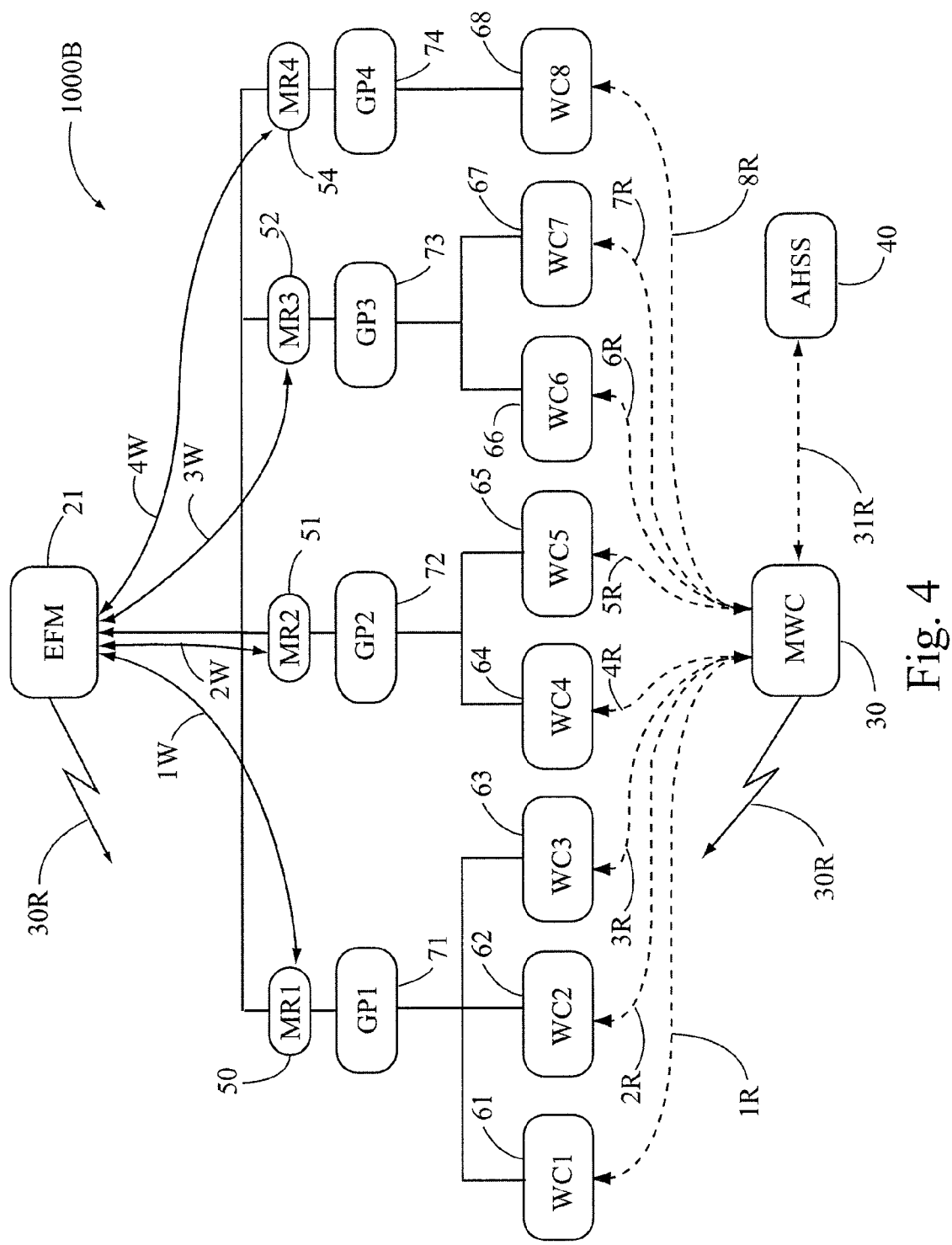
FIG. 4 is a function block diagram of another embodiment of the present apparatus, said embodiment comprising one MWC, one EFM monitoring four meter runs, and eight slave controllers configured into four groups.

In FIG. 4, system embodiment 1000B comprises eight well plunger lift systems. Each slave well controller (SWC) 61, 62, 63, 64, 65, 66, 67, 68 is in wireless connection 1R, 2R, 3R, 4R, 5R, 6R, 7R, and 8R, respectively, with MWC 30. MWC 30 communicates with AHSS 40 via wireless link 31R.

In this example, slave wellhead controller 61, 62, 63 comprise group 71. SWC 64, 65 comprise group 72; SWC 66, 67 comprise group 73 and SWC 68 comprises its own group 74. Production flow from groups 71, 72, 73, 74 is metered by means of meter runs 50, 51, 52, 54, respectively. As shown, EFM 21 monitors meter runs 50, 51, 52, 54 and thus, tracks and/or records data from groups 71, 72, 73, 74. EFM 21 is shown respectively hard wired 1W, 2W, 3W, 4W to each meter run 50, 51, 52, 54 as is usually done when an EFM and a meter run are in close proximity. Data is transmitted to MWC 30 by means of wireless link 30R.

Figure 5:
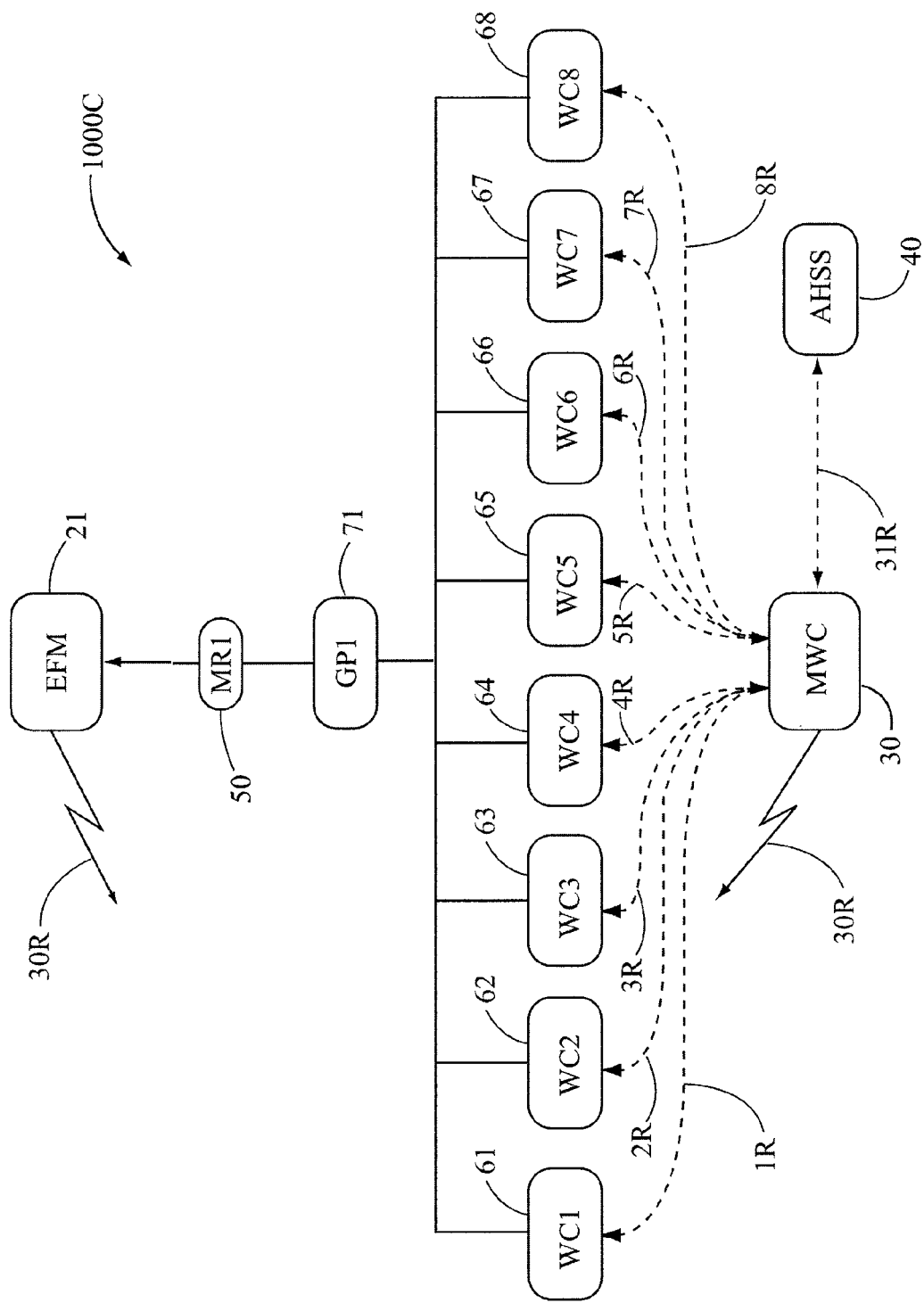
FIG. 5 is a function block diagram of another configuration of a MWCS system, said system comprising one MWC, one EFM monitoring one meter run, and eight slave controllers configured into one group.

In FIG. 5, system embodiment 1000C comprises eight well plunger lift systems. In this example, slave wellhead controllers 61, 62, 63, 64, 65, 66, 67, 68 comprise group 71. This configuration could signify that all eight wells are low producers. To maximize design considerations, an operator may choose to route the production flow from a group of weak wells through one meter run as shown here. Thus, EFM 21 monitors meter run 50 by means of a hard wired connection and tracks and/or records data from group 71. Data is transmitted to MWC 30 by means of wireless link 30R. Each slave well controller 61, 62, 63, 64, 65, 66, 67, 68 is in wireless connection 1R, 2R, 3R, 4R, 5R, 6R, 7R, and 8R, respectively, with MWC 30.

Figure 8:
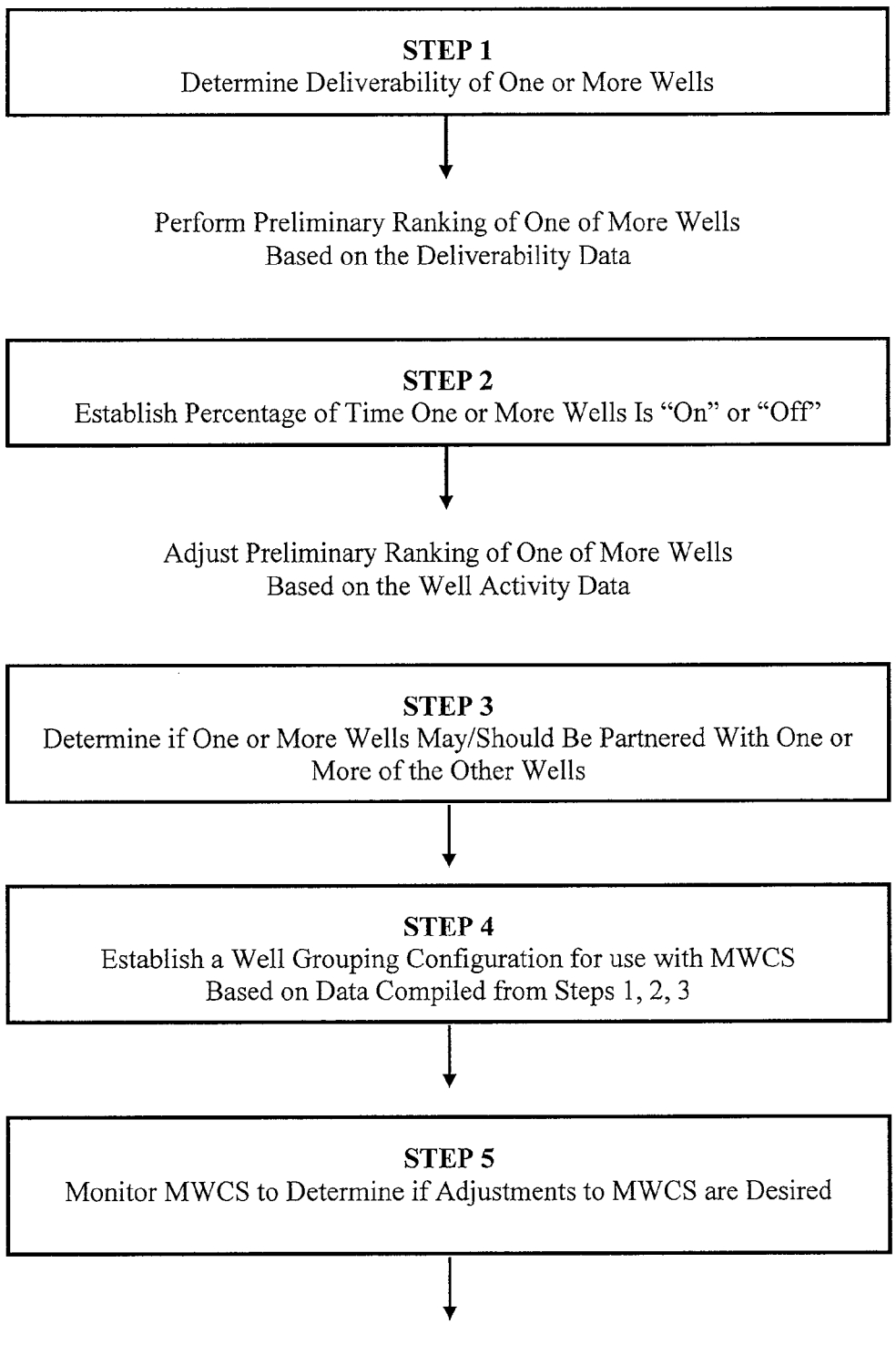
FIG. 8 is a simple flow diagram describing a method for grouping multiple wells.

FIG. 8 describes a method for grouping multiple wells. To provide a preliminary or rough ranking of one or more wells relative to each other, an operator initially determines the deliverability of one or more wells as set forth in Step 1. In Step 2, the operator can enhance the ranking by applying a secondary measure based on the percentage of time a well is on/off. For example, a strong well that is "On" 70% of the time ("Off" 30% of the time) would be ranked differently than a strong well that is "On" 50% of the time ("Off" 50% of the time). Based on the deliverability and the active period of the well, the operator can determine which wells can be partnered together in Step 3. As stated above, a well will fight with another well to turn on. An optimum partnering results when each of the wells within a group causes minimal impedance to others in that group. For example, an operator may determine that an intermediate well that is "On" 33% of the time ("Off" 66% of the time) would be a good partner with an intermediate well that is "On" 66% of the time ("Off" 33% of the time). Similarly, an operator could determine that a strong well that is "On" 92% of the time ("Off" 8% of the time) could be grouped individually. These groupings are presented by example to illustrate the discretion of an operator and the dynamic nature of multiple well grouping(s), and not of limitation; various embodiments are possible. In Step 4, an operator establishes a well assignment configuration adaptable to a multi-well control system. An optimum well configuration can even out the well cycle times so each well has an opportunity to produce. An operator can change the configuration by monitoring the MWCS and accessing the MWC as set forth in Step 5. For example, an operator may choose to regulate production by re-grouping the wells so some higher producers are shut in more.

Table 1 describes an algorithm for determining operation hierarchy within well groups so multiple wells can be synchronized. From the Modbus configuration registers, an operator can configure a list of wells in a group. Configuration can take place when a system is initially powered up or at any time an operator desires a change in well grouping. During these times, well priorities can be set by default to well number order with the exception of any open wells remaining at the bottom of the priority list. For the purpose of selecting the next well to open in a group, an operator will categorize a well as "closed" (well is shut-in and not ready to open), "ready" (well is shut-in but conditions are such that is ready to open or "open" (well is flowing).

TABLE 1

| Time, sec | Group I | | | Group II | | | Group III | |
| --- | --- | --- | --- | --- | --- | --- | --- | --- |
| | Well 1 | Well 4 | Well 7 | Well 2 | Well 5 | Well 8 | Well 3 | Well 6 |
| 0 | #1 ready | #2 ready | #3 ready | #1 closed | #2 ready | #3 ready | #1 closed | #2 ready |
| 10 | #3 open | #1 ready | #2 ready | #1 closed | #3 open | #2 ready | #1 closed | #2 open |
| 1800 | #3 open | #1 ready | #2 ready | #1 closed | #3 closed | #2 ready | #1 closed | #2 closed |
| 1810 | #3 open | #1 ready | #2 ready | #1 closed | #2 closed | #3 open | #1 closed | #2 closed |
| X | #3 closed | #1 ready | #2 ready | #1 closed | #2 closed | #3 open | #1 closed | #2 closed |

TABLE 1-continued

| Time, sec | Group I | | | Group II | | | Group III | |
| --- | --- | --- | --- | --- | --- | --- | --- | --- |
| | Well 1 | Well 4 | Well 7 | Well 2 | Well 5 | Well 8 | Well 3 | Well 6 |
| X + 10 | #2 closed | #3 open | #1 ready | #1 ready | #2 closed | #3 open | #1 closed | #2 closed |
| Y – 10 | #2 closed | #3 open | #1 ready | #1 ready | #2 ready | #3 open | #1 closed | #2 ready |
| Y | #2 closed | #3 open | #1 ready | #1 ready | #2 ready | #3 open | #1 closed | #2 open |
| Z – 10 | #2 closed | #3 closed | #1 ready | #1 ready | #2 ready | #3 open | #1 closed | #2 ready |

Table 1 is an example applied to 8 wells that are configured into 3 groups. Group 1 comprises Well 1, Well 4, and Well 7. Group 2 comprises Well 2, Well 5, and Well 8. Group 3 comprises Well 3 and Well 6. The priority for a well is assigned a numeric value of #1 through #8 (or #1 through the number of wells in the group). At start up, Wells 1, 4, and 7 are "ready." Well 2 and Well 3 are "closed". Well 5 and Well 6 are "ready".

In addition to monitoring various well parameters, the master controller detect which well is on. In this embodiment, if all of the wells are closed or ready, the master controller will scan the list of wells in each group once every 10 seconds. The MWC will test the wells having a #1 priority first to determine if the designated well is ready to open. If that well is not ready to open, the MWC will check the well with the next lowest priority, e.g., #2, to see if that designated well is ready to open. The MWC reads through the list until all the wells have been tested or it has found a well ready to open.

To illustrate, when Group 1 is scanned, Well 1 which was assigned #1 priority, is ready to open. Thus, it will be opened and then assigned the lowest number on the priority list for the group, e.g. #3. Well 4 then is assigned #1 priority, signifying that it will be the next well to turn if it is ready to open. Well 7 then is assigned #2 priority. When Group 2 is scanned, the MWC determines that Well 2 is not ready to open. Well 5 then is tested. Because Well 5 is ready, it will be opened and then assigned the lowest number on the priority list for the group, e.g. #3. Well 5 is moved to the bottom of the priority list for Group 2. Well 2 maintains its status in Group 2 as the well having the highest priority, signifying that it will be the next well to turn if it is ready to open. Well 8 then is assigned #2 priority. When Group 3 is scanned, the MWC determines that Well 3 is not ready to open. The MWC then tests and opens Well 6. Because there are only 2 wells in Group 3, Well 6 remains at the bottom of the priority list for that group. By moving the well that is currently open to the bottom of the priority list and moving the other wells up in the list, the MWC automatically gives the wells that have been shut in the longest the highest priority.

Assume that after 30 minutes Well 1 continues to flow and Well 5 and Well 6 both shut in. The status of Group 1's priority and well readiness remains as is. In Groups 2 and 3, Wells 5 and 6 are now closed. When Group 1 is scanned, the MWC detects an open well. The MWC allows the well to continue producing; there is no change in the priorities for Group 1. When Group 2 is scanned, the MWC determines that there are no open wells. Because Well 2 holds the highest priority, it is checked first. However, it is not ready to open. Well 8 then is tested. Because Well 8 is ready, it will be opened and then assigned the lowest number on the priority list for the group, e.g. #3. Well 5, which previously held the #3 priority, is moved up in priority to #2. When Group 3 is scanned, the MWC determines that there are no open wells. In addition, there are no wells that are deemed to be ready. Therefore, there is no change in the priorities for Group 3.

Some period later Well 1 shuts in. Thus, when Group 1 is scanned, Well 4 will be opened because it is ready, and then assigned the lowest number on the priority list for the group, e.g. #3. The remaining wells in Group 1 will then be shifted up in priority. When Group 2 is scanned, the MWC detects that Well 8 is open. Because the MWC detects an open well, it will allow the well to continue producing; there is no change in the priorities for Group 2.

The pressures build rapidly on Well 5 and Well 6. They are again ready to open. Assume that just before the controller scans to open a well at time Y, the priority and well readiness is set forth at a time of about t=Y−10.

At t=Y, the MWC scans the groups to see if new wells need to be opened. Because Groups 1 and 2 each have an open well in each group, the MWC will allow the respective wells to continue producing; there is no change in the priorities for Groups 1 and 2. When Group 3 is scanned, the MWC determines that Well 3 (#1 priority) is not ready to open. Well 6 is then tested and is allowed to open. Well 6 will retain its low priority for Group 3.

At some point t=Z−10, Well 4 will shut in. Because Well 7 has been shut in for the longest period of time of the Group 1 wells, the MWC will allow it to open when Well 4 shuts in. In Group 2, there are two wells that could be ready to open. Because Well 2 has been shut in for the longest period of time in Group 2, the MWC will open it next when Well 8 shuts in. In Group 3, Well 6 can continue operating essentially independently (opening and closing as well conditions permit) as long as Well 3 does not come ready. When Well 3 becomes ready to open, it will open immediately if Well 6 happens to be closed. If, however, Well 6 is open at the time that Well 3 becomes ready, Well 3 will open as soon as Well 6 closes.

These groupings and well readiness determinations are presented by example to illustrate the adaptability of the MWCS to various well characteristics, and not of limitation; various embodiments are possible. An operator may configure and re-configure the well synchronization strategy as desired.

As stated above, operators are challenged to ensure that each well has a fair opportunity to achieve a sales time. In some cases, a well may not have produced in its normal time slot for a few iterations. The present apparatus and methodology can be used to assign a low or lower producing well a top hierarchy among the various wells.

Well system managers are tasked with properly allocating product to an owner/investor. Standard industry practices involve apportioning a percent of gas determined from an overall measurement and a baseline well test. In some cases, an overall measurement may not reconcile with the baseline test, which could result in significant errors in allocation. During production, gas/oil from a well flows from the wellhead, through a flow line and across a metered orifice plate. When the well is closed at the wellhead, higher pressured gas/oil contained between the wellhead and orifice plate will continue to flow "downstream" and cross the orifice plate in the meter run. Thus, production can commingle with production from a successor well if the successor well turns on while the predecessor gas is still trying to clear the orifice plate. In some cases this may not be an issue, especially if line pressures downstream of the orifice plate are not significantly lower than the upstream well lateral pressures. If there is a problem with this "unassigned gas" being improperly allocated to successor wells, there are two additional, selectable options for the operator. Option #1 simply allocates all gas to the predecessor well until the successor well turns on. The successor may not be allowed to turn on until gas flow through the respective orifice plate has diminished to a low, programmable set-point in the MWC. This "low flow" set-point is also a selectable subset contained within option #1. Option #2 simply allocates any gas that was measured between the time that the predecessor well turns off and successor well turns on to a "phantom" or an "9th" well. A $9^{th}$ phantom well is presented to illustrate gas assignment/allocation in a well grouping comprising 8 wells. In configurations having fewer or more than 8 wells, the phantom well is not necessarily deemed to be the "$9^{th}$ well." For example, a well grouping may comprises 100 wells. The "phantom" well is simply an allocation of any gas that was measured between the time that a predecessor well turns off and a successor well turns on. Gas production assigned to the "phantom well can be manually reallocated at the end of the contract period based the % that each well contributes to the sum of the group. The present apparatus allows well system managers to more fairly apportion product to an owner/investor. With the MWCS, any one or more investors may choose to allocate its share of product to a well based on current history data. Typically, the gas is allocated to the predecessor well. In addition, the present apparatus allows for the allocation of product to a "phantom" well so that the product can later be distributed.

While a number of exemplifying features and embodiments have been discussed above, those of skill in the art will recognize certain modifications, permutations, additions and subcombinations thereof. No limitation with respect to the specific embodiments disclosed herein is intended or should be inferred. Other alternate embodiments of the present apparatus could easily be employed by those skilled in the art to achieve the multiple well control functions of the present apparatus. It is to be understood that additions, deletions, and changes may be made to the system's hardware, software, firmware and various internal and external functions disclosed herein, including but not limited to well configuration and field equipment, and still fall within the true spirit and scope of the multiple well control system.

We claim:

1. A well control system for operating a plurality of production wells in relation to one another to maximize utilization of shared production facilities comprising flow lines, piping, compressors, compressor stations, tankage, separators or combinations thereof, said system comprising:
   at least one aboveground production well controller mounted on a wellhead flow line for each of the plurality of production wells;
   each of the plurality of production wells having a flow routable through a meter run/flow line shareable by one or more of the production wells, the meter run/flow line in communication with a shared production facility;
   at least one well flow measuring device mounted on the wellhead flow line of each of the plurality of production wells, the at least one flow measuring device being either existing infrastructure or newly installed infrastructure;
   a master well controller communicating with one or more of the well flow measuring devices, one or more of the production well controllers or combinations thereof; and
   wherein the master well controller can monitor data derived from the one or more well flow measuring devices, one or more production well controllers or combinations thereof, to determine the sequence by which to open or close a surface valve located upstream of the shared production facility based on a portion of the data, thereby opening or closing the one or more production wells in relation to one another so as to enable flow optimization and to reduce the occurrence of bottlenecks at the shared production facility.

2. The system of claim 1, wherein the reduction of bottlenecks results from coordinating the operation of a higher producing well having a longer cycle time with the operation of a lower producing well having a shorter cycle time.

3. The system of claim 1, wherein the at least one production well controller is either existing infrastructure or newly installed infrastructure.

4. The system of claim 3 further comprising a translator to enable communications between the master well controller and existing infrastructure or newly installed infrastructure, thereby reducing the need to retrofit existing infrastructure.

5. The system of claim 4 further comprising software/firmware that can allow for field-upgradability of the various system components.

6. The system of claim 4, wherein the one or more production well controllers comprise software/firmware that can allow operation of a well semi-independently or autonomously in case of equipment failure at the master well controller.

7. The system of claim 3, wherein one or more of the plurality of production wells can be equipped with a plunger lift system controllable by the master well controller or the one or more production well controllers.

8. The system of claim 1, wherein the master well controller utilizes a production algorithm to favor lower producing wells having shorter cycle intervals over higher producing wells having longer cycle intervals, thereby allowing the lower producing wells to operate in view of the higher producing wells.

9. The system of claim 8, wherein the master well controller utilizes a production algorithm to group one or more lower producing wells or higher producing wells into groups and to determine which groups of wells operate in relation to other groups of wells, thereby allowing a maximization of production.

10. The system of claim 1, wherein the master well controller utilizes an accounting algorithm to allocate some or all of a total flow volume to one or more individual production wells for accounting purposes.

11. The system of claim 1, wherein the master well controller utilizes an accounting algorithm to allocate a portion of a flow volume to one or more "phantom" wells to facilitate an allocation of production, thereby allowing a more fair apportionment of product to an owner/investor, the flow volume being the amount of product residing in a pipeline before an open well shuts in and after another well opens.

12. The system of claim 1, wherein the one or more production well controllers can control well production based on a default algorithm if communication with the master well controller is lost.

13. The system of claim 1, wherein the master well controller can perform one or more verification tests to determine a communication status with the one or more production well controllers.

14. A well control system for remotely controlling and operating the opening and closing of one or more hydrocarbon production wells in relation to one another for flow optimization purposes, said system comprising:
   an aboveground production well controller mounted on a wellhead flow line of a first production well;

a plurality of flow measuring devices, each mounted on a wellhead flow line associated with other production wells, the flow measuring devices being either existing infrastructure or newly installed infrastructure;

the first production well having a flow routable through the plurality of flow measuring devices;

a master well controller communicating with the production well controller, the plurality of flow measuring devices or a combination thereof; and wherein the master well controller can monitor data derived from the production well controller, the plurality of flow measuring devices or the combination thereof, to determine the sequence by which to open or close a surface valve located upstream of a shared production facility based on a portion of the data, thereby opening or closing the one or more production wells in relation to one another so as to enable flow optimization and to reduce the occurrence of bottlenecks at the shared production facility.

15. The system of claim 14 further comprising a translator to enable communications between the master well controller and a variety of types of existing infrastructure or newly installed infrastructure, thereby reducing the need to retrofit existing infrastructure.

16. The system of claim 14, wherein product from the one or more wells can flow through any one of the plurality of flow measuring devices.

17. A well control system for controlling the opening and closing of a plurality of hydrocarbon production wells in a multiple well facility for flow optimization purposes to reduce the occurrence of flow bottlenecks, said system comprising:

a plurality of production well controllers, each of the plurality of production well controllers mounted at a surface location adjacent a wellhead for a production well producing a flow;

each of the plurality of production well controllers receiving and recording data from a plurality of above ground flow measuring devices; and at least one master well controller to monitor data derived from the plurality of flow measuring devices, the plurality of production well controllers, or both, and to open/close one or more of the production wells in a sequential relationship with each other based on a portion of the data, thereby adjusting well production for one or more of the production wells in a matter determined to be a maximization of production.

18. The system of claim 17, wherein the plurality of production well controllers comprises software/firmware that can allow operation of the respective wells semi-independently or autonomously in case of equipment failure at the master well controller.

19. The system of claim 17, wherein each of the plurality of production wells can be equipped with a plunger lift system controllable by the at least one master well controller.

20. The method of claim 17, wherein the at least one master well controller utilizes an accounting algorithm to apportion some or all of a designated flow volume to an individual production well or an illusory well to facilitate an allocation of production.

21. The system of claim 17, wherein the maximization of production is established by an examination of the length of well cycle time.

22. A multi-well control system operating a one or more wells or discrete groups of wells based on well production characteristics so as to reduce bottlenecking at a shared production facility, said system comprising:

at least one master well controller communicating with one or more production well controllers each receiving production data from one or more wells, the one or more wells in fluid communication with a shared production facility;

wherein said production data can be used to establish a well grouping configuration comprising one or more wells assignable to one or more discrete well groups, said discrete well groups based on predetermined criteria; and wherein said at least one master well controller utilizes a control algorithm to restrict the operation of a certain discrete well groups in favor of other discrete well groups to reduce the occurrence of bottlenecking at the shared production facility and to minimize downtime.

23. The system of claim 22, wherein the criteria by which said assignment of wells occurs can be based on a production level of said one or more wells.

24. The system of claim 23 further comprising a grouping of one or more wells to regulate one or more higher producing wells in view of lower producing wells, thereby enabling said lower producing wells an opportunity to produce for a period of time.

25. The system of claim 22, wherein the at least one master well controller comprises software/firmware that can contemporaneous modify or field-adjust the operation of the one or more wells based on an analysis of the well production data.

26. The system of claim 22, wherein the one or more production well controllers can operate the one or more wells if communication with said at least one master well controller is lost.

27. The system of claim 22, wherein said synchronization further comprises assigning a dynamic time slot based on said production data to said one or more wells, said dynamic time slot useful for calculating a sequence in which said one or more wells can be opened.

28. The system of claim 27 further comprising modification of said dynamic time slot assigned to said one or more wells based on production data.

29. The system of claim 22, wherein the at least one master well controller can remove one or more wells in a well grouping configuration if communication with one or more associated slave well controllers is lost.

30. A multi-well control system monitoring and allocating production from one or more wells, said system comprising:

at least one master well controller communicating with one or more slave well controllers, each receiving production data from one or more wells, the one or more slave well controllers being either existing infrastructure or newly installed infrastructure;

wherein product from one or more open wells can flow across a respective meter during production, before said one or more open wells shut in and one or more successor wells opens, thereby becoming known as predecessor wells;

wherein an amount of product attributable to said one or more predecessor wells can continue to flow across a respective meter;

wherein said attributable amount of product can be allocated to a specific target, the target being one or more existing wells or an illusory well.

31. The system of claim 30, wherein said one or more successor wells may not be allowed to be open until product flow through said respective meter has diminished to a predetermined set point.

32. The system of claim 30, wherein the illusory well represents product measured between the time that one or more predecessor wells shuts in and one or more successor wells opens.

33. The system of claim 30, wherein at least a portion of the amount of product in an illusory well can be apportioned to a real owner/investor.

34. The system of claim 30 further comprising a translator to enable communications between the at least one master well controller and a variety of types of existing infrastructure or newly installed infrastructure, thereby reducing the need to retrofit existing infrastructure.

* * * * *